United States Patent [19]

Brogan et al.

[11] 4,030,787

[45] June 21, 1977

[54] TURNTABLE BEARING

[75] Inventors: Joseph Brogan, Kent; Irwin Gerald Baker, Bellevue, both of Wash.

[73] Assignee: The Boeing Company, Seattle, Wash.

[22] Filed: Mar. 30, 1976

[21] Appl. No.: 671,925

[52] U.S. Cl. .............................................. 308/227
[51] Int. Cl.² ...................................... F16C 19/10
[58] Field of Search .......... 308/3 R, 3 A, 174, 177, 308/178, 183, 182, 207 R, 208, 227

[56] References Cited

UNITED STATES PATENTS

| | | | |
|---|---|---|---|
| 3,258,301 | 6/1966 | Porvator | 308/227 |
| 3,498,685 | 3/1970 | Poplinski | 308/3 R |
| 3,517,975 | 6/1970 | Lonngren et al. | 308/227 |

*Primary Examiner*—Joseph F. Peters, Jr.
*Assistant Examiner*—Gene A. Church
*Attorney, Agent, or Firm*—Frederick J. McKinnon, Jr.; Bernard A. Donahue

[57] ABSTRACT

A turntable bearing which is particularly well adapted for securing an adjustable airfoil to the fuselage of an aircraft. The disclosed preferred embodiment comprises a ring shaped structure consisting of a lower support ring, an inner and an outer bearing, a tee ring, and an annular bearing plate. A dovetail groove is placed into the top surface of the support ring around its circumference. Within the groove are the inner and outer bearings with the tee ring located between them. Both bearings and the tee ring engage the top surface of the annular bearing plate which is also within the groove.

10 Claims, 2 Drawing Figures

TURNTABLE BEARING

BACKGROUND OF THE INVENTION

1. Field of the Invention

The present invention relates to a bearing specifically adapted to securing to the fuselage of an aircraft, a single wing having an adjustable feature. More particularly, this invention relates to a bearing which facilitates rotations of this wing about an axis which is normal to the plane of the wing so as to permit adjustament of the angle of the wing with respect to the aircraft fuselage.

2. Background

Aircraft employing adjustable, variable sweepback wings are well known. Such adjustable sweepback wings provide a proven solution to problems encountered when such aircraft progress from the transonic to the supersonic region of flight. The oblique wing designed aircraft, comprising a single, adjustable yawed wing, potentially offers the same advantges as its swept wing counterpart while at the same time improving aircraft efficiency between transonic and supersonic flight. This is a direct result of the high lift-to-drag ratio achieved in the cruise mode when the wing is in the yawed position. In addition, the high aspect ratio available with the wing in the unyawed position provides excellent landing and takeoff characteristics for this type of aircraft.

To accomplish the adjustment of the angle of the wings with respect to the aircraft's fuselage, bearings are normally provided which secure the wings to the fuselage. Various bearings have been devised to accomplish these required adjustments and have usually featured either spherically shaped bushings or a combination of sleeve and roller type bearings.

Regardless of the type of bearing employed for this application, it must carry a variety of loads ranging from those encountered during supersonic flight to those encountered when the aircraft is stationary. In addition, the bearing must be failsafe and possess those characteristics required for any aircraft use; namely lightness and ease of maintenance.

The present invention provides solutions to these requirements. It has demonstrated an ability to perform when subject to bearing stress loads of 50,000 pounds per square inch. Due to its dovetail groove and circular shape, the bearing is inherently failsafe since any failure of one of the bearing sides results in the load being carried by the remaining bearing side. The simplicity of bearing design as well as the existence of a minimum number of elements required for the assembly of the bearing promotes lightness and ease of maintenance. Finally, the bearing provides an adjustment feature which compensates for wear incident to normal bearing operation.

The dovetail groove is not new, having been shown by Poplinski, U.S. Pat. No. 3,498,685. Although this patent shows a bearing with a cross-section similar to the present invention, the Poplinski invention is distinguishable in that it is linear in shape, not circular, and hence is non-redundant. The present invention obtains its inherent redundancy due to the use of a dovetail groove in a circular shape. Finally, the Poplinski invention does not provide the adjustment feature of the present invention.

Lonngren, et al., U.S. Pat. No. 3,517,975, have shown a circular bearing similar in shape to the present invention. That patent, however, is directed to roller bearing construction and does not employ the dovetail groove as the bearing surface as does the present invention. In addition, that invention lacks any adjustability feature needed to compensate for normal bearing wear.

SUMMARY OF THE INVENTION

This invention is directed in general to bearings, and more specifically, it is directed to a bearing formed by a dovetail groove machined into a support ring assembly in which the component parts of the bearing are assembled. The foregoing combination provides a unique turntable bearing that is inherently failsafe and is adjustable with respect to varying load requirements or to normal bearing wear.

DESCRIPTION OF THE PREFERRED EMBODIMENT

Figure 1:
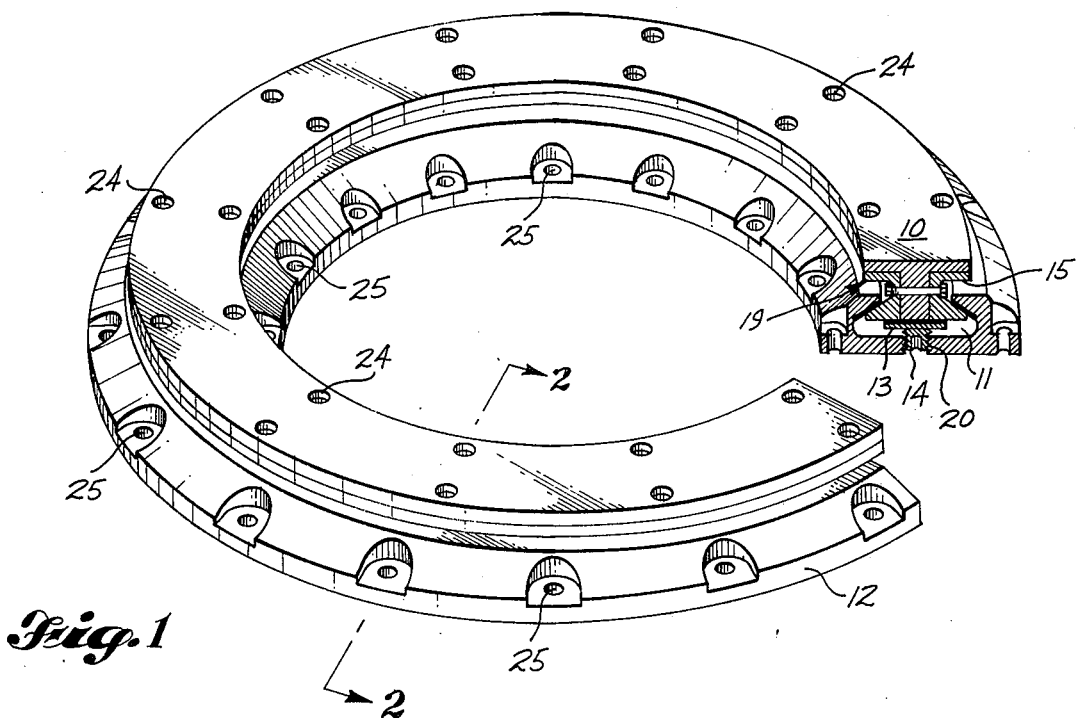
FIG. 1 is a perspective view of the turntable bearing with a portion of the bearing broken away to illustrate the cross-sectional view.
Figure 2:
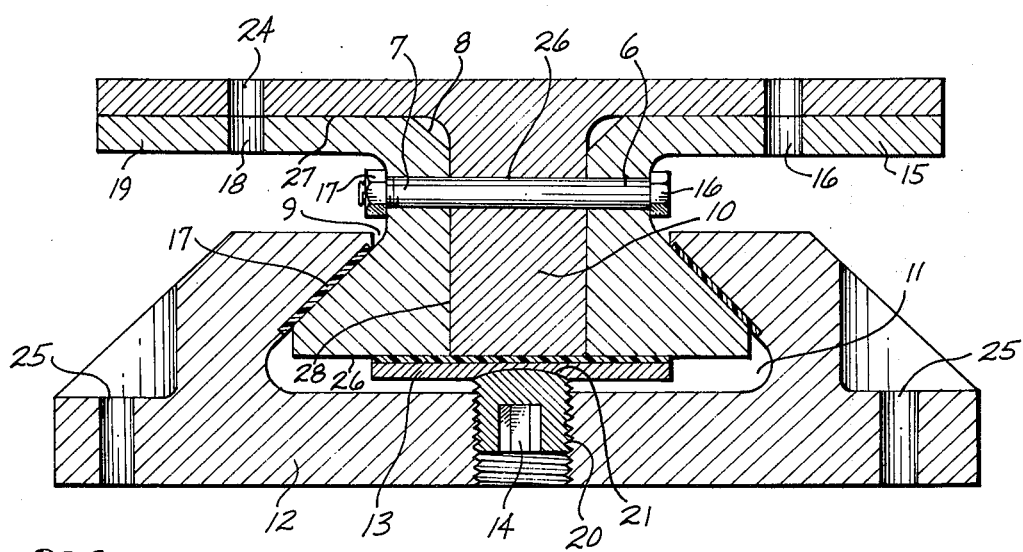
FIG. 2 is an enlarged, cross-sectional view of the turntable bearing shown in FIG. 1 taken along the line 2—2.

The turntable bearing described in the following sections is a ring shaped structure and consists essentially of a lower support ring, an inner bearing, an an outer bearing, an annular bearing, and a tee ring. A groove, generally in the shape of a female dovetail, is machined into the top surface of the lower support ring around its circumference. Within this groove are located both the inner bearing, the tee ring, and the outer bearing. The tee ring is positioned within the groove such that it is between the inner bearing on one side and the outer bearing on the opposite side. Both the inner and outer bearing, as well as the tee ring, contact the top surface of the annular bearing plate which is also located within the groove.

The lower support ring 12 is circular in shape with a trapezoidal-like cross-sectional area. It will be noted that the trapezoidal sides of 12 have each been truncated to remove excess material and to prevent the occurrence of razor-like corners. Machine ground into the upper surface of 12 is a female dovetail groove 11 which extends around the entire circumference of 12. The groove is positioned in 12 in such a manner as to be substantially equal distant from both the bottom surface and trapezoidal sides of 12. The inside corners of 11 have a slight radius to minimize the formation of stress cracks due to bearing loading and use. Additionally, a narrow margin 9 at the juncture of the groove 11 and the top surface of 12 is provided to allow for a slight corner clearance between groove 11 and the inner bearing 19 and outer bearing 15. The sides of groove 11 are coated with a teflon based fabric 17, typically PTFE, which provides increased lubrication as the pressure between 12 and 19, or 12 and 15 increases.

Inner bearing 19 is a circular ring in shape with a diameter slightly smaller than that of bearing plate 13, or dovetail groove 11. In cross section, 19 resembles that of truncated U, with the lower surface of 26 being substantially shorter and thicker than that of the upper surface 27. Both lower and upper surfaces of 19 are parallel with each other and are substantially perpendicular to the inner surface 28.

It will be noted that a narrow margin 8 has been provided to allow for a slight corner clearance at the juncture of bearing 19 and dovetail groove 11, as well as at the juncture of 19 and tee ring 10. Additionally, the inner corners of bearing 19 have been provided with a slight radius to minimize the susceptability of the formation of fatique cracks at these locations.

A plurality of holes 7 are provided at equal spaced intervals along the circumference of the inner surface 28 of bearing 19 to allow for securing 19 to the tee ring 10 and the outer bearing 15 by bolt 16 and nut 17. Additionally, a plurality of holes 18 are provided at equal spaced intervals along the circumference of the upper surface 27 of bearing 19 to allow for securing 19 to tee ring 10 and to the lower wing surface.

Inner bearing 19 is fabricated typically from steel or aluminum, although its exact composition depends upon its application and the type of loading to which the bearing will be subjected. In the assembly of the invention, inner bearing 19 is machined into its completed shape, then sectioned into three, identical, one hundred and twenty degree sections. As each section is placed in the dovetail groove 11, it is secured to tee ring 10 and outer bearing 15 by bolt 16 and nut 17. The remaining sectioned portions of 19 are sequentially placed in the female dovetail groove and secured to 10 and 15.

Inner bearing 19 surfaces which come in contact with the dovetail groove 11 and the annular bearing plate 13, are coated with the same teflon based fabric 17 as the upper surface of 13. In this manner, lubrication is provided between these members as has been previously described.

Outer bearing 15 is a circular ring in shape with a diameter slightly larger than that of plate 13 and dovetail groove 11. In cross section, outer bearing 15 is an exact mirror image of inner bearing 19. As has been previously discussed, bearing 15 includes a plurality of holes 6 which align with corresponding holes in 19 and 10 for securing bearing 15 to tee ring 10 and inner bearing 19 by bolt 16 and nut 17. In a similar manner to that of bearing 19, bearing 15 contains a plurality of holes 16 for securing 15 to the lower wing surface. Outer bearing 15 is first machined into its completed shape, then sectioned into three equal, one hundred twenty degree sections as was bearing 19. All surfaces of 15 which come in contact with plate 13 or dovetail groove 11 are coated with the teflon based fabric 17, as was 19.

Tee ring 10 is also circular in shape with a diameter that is substantially the same as bearing plate 13. In cross section, 10 has the shape of a "tee" with the center leg substantially thicker than either arm. It is to be noted that the inside corners of 10 are machined with a slight radius to minimize the formation of cracks due to metal fatique and stress.

The center leg of 10 contains a plurality of holes 26 which align with the holes contained within the inner bearing 19 and the outer bearing 15 to allow for securing 19 to the tee ring 10 and the outer bearing 15 by bolt 16 and nut 17. Additionally, a plurality of holes 24 are provided at equal spaced intervals along each arm of tee ring 10 which align with the plurality of holes in 19 and 15, as previously discussed, to secure 10 to the lower wing surface. All surfaces of 10 which come in contact with plate 13 are coated with teflon based fabric 17 to minimize surface-to-surface friction.

A plurality of threaded holes 20 are provided on the bottom surface of ring 12 and exist substantially at equal spaced intervals along the circumference of ring 12. These threaded holes are located at equal distances from the truncated sides of 12 and accomodate the plurality of adjustment screws 14. The plurality of adjustment screws pass through threaded holes 20 and extend upwardly from the lower surface of ring 12 and engage the lower surface of annular bearing plate 13. In the preferred embodiment, the screws 14 have a 4.0 pitch and have a spheroid shaped head.

A plurality of holes 25 are provided at substantially equal spaced intervals along the non-parallel sides of 12. Such holes extend through ring 12 in such a manner as to allow 12 to be secured to the fuselage of the aircraft by securing means located on such fuselage.

Annular bearing plate 13 is a circular ring in shape with a rectangular cross-sectional area. Both top and bottom surfaces of plate 13 are parallel with each other and are machined to a substantial flatness. Plate 13 is somewhat smaller in diameter than ring 12, and fits within the dovetail groove 11 of ring 12. A plurality of spheroid pockets 21 are machined into the bottom surface of 13 at equal spaced intervals along the circumference of 13. These pockets align with the plurality of threaded holes in 12 such that when adjustment screws 14 extend upwardly from the bottom surface of 12, the spheroid heads of 14 engage the spheroid pockets of 13. In this manner, the entire plate 13 may be raised or lowered within groove 11 by screws 14. The spheroid shaped head of 14, as well as the spheroid shape of the corresponding pockets, provides a means whereby the bearing plate 13 may pivot within the dovetail groove 11, thus insuring a complete contact between the bearing surface of plate 13 and members 10, 15, and 19. In an alternate embodiment of the present invention, the plurality of spheroid shaped pockets may be replaced by a spheroid shaped groove extending around the circumference of plate 13 and located equal distances from both sides of plate 13. The bearing surface of plate 13 is coated with teflon based fabric 17 which provides increased lubrication qualities as the pressure between corresponding members increases.

What is claimed is:
1. A turntable bearing comprising:
   a lower support ring having a groove therein along the top surface of said ring extending around the circumference of said ring with said groove having an inner and outer surface and a shape which is wider at its bottom than at its top;
   an inner bearing having a circular ring shape adapted to fit within said groove and adapted to contact the inside surface of said groove;
   an outer bearing having a circular ring shape adapted to fit within said groove and adapted to contact the outside surface of said groove;
   a tee ring adapted to fit within said groove and between said inner bearing and said outer bearing;
   means for securing said tee ring to said inner bearing and said outer bearing; and,
   means for raising or lowering said inner bearing, said tee ring, and said outer bearing within said groove.
2. The turntable bearing of claim 1 wherein said securing means consists of a threaded bolt, the head of said bolt abutting said outer bearing and a nut abutting said inner bearing and attached to the end of said bolt.

3. The turntable bearing of claim 1 wherein said means for raising or lowering said inner bearing, said tee ring, and said outer bearing comprises:
   an annular bearing plate having an upper surface and lower surface adapted to fit within said groove with said inner bearing, said outer bearing, and said tee ring resting thereupon;
   a plurality of threaded holes extending upwardly from the lower surface of said lower support ring to the bottom of said groove;
   a plurality of adjustment screws adapted to fit within and contact the sides of said threaded holes, the heads of said screws engaging said lower surface of said annular bearing plate.

4. The annular bearing plate of claim 3 having therein a plurality of spheroid shaped pockets in said lower surface, said pockets being in alignment with said threaded holes in said support ring, and said pockets engaging said adjustment screws.

5. The adjustment screws of claim 3 having a spheroid shaped head and adapted to fit within said pockets of said annular bearing plate.

6. A bearing apparatus for securing an adjustable airfoil to the fuselage of an aircraft comprising:
   a lower support ring having a groove therein along the top surface of said ring extending around the circumference of said ring with said groove having an inner and outer surface and a shape which is wider at its bottom than at its top;
   an inner bearing having a circular ring shape adapted to fit within said groove and adapted to contact the outside surface of said groove;
   a tee ring adapted to fit within said groove and between said inner bearing and said outer bearing;
   means for securing said tee ring to said inner bearing and said outer bearing; and,
   means for raising or lowering said inner bearing, said tee ring, and said outer bearing within said groove.

7. The turntable bearing of claim 6 wherein said securing means consists of a threaded bolt, the head of said bolt abutting said outer bearing and a nut abutting said inner bearing and attached to the end of said bolt.

8. The turntable bearing of claim 6 wherein said means for raising or lowering said inner bearing, said tee ring, and said outer bearing comprises:
   an annular bearing plate having an upper surface and lower surface adapted to fit within said groove with said inner bearing, said outer bearing, and said tee ring resting thereupon;
   a plurality of threaded holes extending upwardly from the lower surface of said lower support ring to the bottom of said groove;
   a plurality of adjustment screws adapted to fit within and contact the sides of said threaded holes, the heads of said screws engaging said lower surface of said annular bearing plate.

9. The annular bearing plate of claim 6 having therein a plurality of spheroid shaped pockets in said lower surface, said pockets being in alignment with said threaded holes in said support ring, and said pockets engaging said adjustment screws.

10. The adjustment screws of claim 6 having a spheroid shaped head and adapted to fit within said pockets of said annular bearing plate.

* * * * *